(12) United States Patent
Matetic et al.

(10) Patent No.: US 10,783,272 B2
(45) Date of Patent: Sep. 22, 2020

(54) METHOD AND SYSTEM OF PRESERVING PRIVACY FOR USAGE OF LIGHTWEIGHT BLOCKCHAIN CLIENTS

(71) Applicant: NEC Europe Ltd., Heidelberg (DE)

(72) Inventors: Sinisa Matetic, Zurich (CH); Ghassan Karame, Heidelberg (DE); Srdjan Capkun, Zurich (CH)

(73) Assignee: NEC CORPORATION, Tokyo (JP)

( * ) Notice: Subject to any disclaimer, the term of this patent is extended or adjusted under 35 U.S.C. 154(b) by 468 days.

(21) Appl. No.: 15/835,477

(22) Filed: Dec. 8, 2017

(65) Prior Publication Data
US 2019/0180047 A1  Jun. 13, 2019

(51) Int. Cl.
*H04L 29/06* (2006.01)
*G06F 21/62* (2013.01)
(Continued)

(52) U.S. Cl.
CPC .......... *G06F 21/6245* (2013.01); *G06F 9/545* (2013.01); *G06F 21/31* (2013.01); *G06Q 20/065* (2013.01); *G06Q 20/223* (2013.01); *G06Q 20/36* (2013.01); *G06Q 20/3674* (2013.01); *G06Q 20/389* (2013.01); *H04L 9/0637* (2013.01); *H04L 9/0825* (2013.01); *H04L 9/3247* (2013.01); *H04L 67/04* (2013.01);
(Continued)

(58) Field of Classification Search
None
See application file for complete search history.

(56) References Cited

U.S. PATENT DOCUMENTS

2017/0352027 A1* 12/2017 Zhang ................ G06Q 20/3678
2018/0025435 A1*  1/2018 Karame ................ G06Q 20/02
                                                            705/30
(Continued)

OTHER PUBLICATIONS

M. Brandenburger, C. Cachin, M. Lorenz and R. Kapitza, "Rollback and Forking Detection for Trusted Execution Environments Using Lightweight Collective Memory," 2017 47th Annual IEEE/IFIP International Conference on Dependable Systems and Networks (DSN), Denver, CO, 2017, pp. 157-168, (Year: 2017).*
(Continued)

*Primary Examiner* — Jeffery L Williams
(74) *Attorney, Agent, or Firm* — Leydig, Voit & Mayer, Ltd

(57) ABSTRACT

A method of preserving privacy for usage of a lightweight blockchain client in a blockchain network includes using, in a full blockchain node of the blockchain network, a secure software guard extensions (SGX) enclave. A request is received from the lightweight blockchain client for a setup of a secure network connection. A client unique ID is received from the lightweight blockchain client, and is acknowledged following a successful attestation by the lightweight blockchain client. A request is received from the lightweight blockchain client for transaction(s)/address(es) of the lightweight blockchain client. The SGX enclave loads and searches unspent transaction outputs (UTXO) from a memory of the full blockchain node and sends a response to the request from the lightweight blockchain client for the transaction(s)/address(es) based on a match from the searching the UTXO. The secure communication is then terminated with the lightweight blockchain client.

14 Claims, 5 Drawing Sheets

(51) Int. Cl.

| | |
|---|---|
| *H04L 9/32* | (2006.01) |
| *G06Q 20/38* | (2012.01) |
| *G06Q 20/22* | (2012.01) |
| *H04L 9/08* | (2006.01) |
| *G06Q 20/06* | (2012.01) |
| *G06Q 20/36* | (2012.01) |
| *G06F 9/54* | (2006.01) |
| *G06F 21/31* | (2013.01) |
| *H04L 9/06* | (2006.01) |
| *H04L 29/08* | (2006.01) |

(52) U.S. Cl.
CPC ....... *H04L 67/104* (2013.01); *G06Q 2220/00* (2013.01); *H04L 2209/38* (2013.01); *H04L 2209/56* (2013.01)

(56) References Cited

U.S. PATENT DOCUMENTS

| | | | | |
|---|---|---|---|---|
| 2019/0080392 | A1* | 3/2019 | Youb | G06Q 40/00 |
| 2019/0081793 | A1* | 3/2019 | Martino | H04L 9/0894 |
| 2019/0095879 | A1* | 3/2019 | Eyal | G06Q 20/06 |
| 2019/0097790 | A1* | 3/2019 | Li | H04L 9/085 |
| 2019/0156301 | A1* | 5/2019 | Bentov | G06Q 20/027 |
| 2019/0158594 | A1* | 5/2019 | Shadmon | H04L 67/42 |
| 2019/0180047 | A1* | 6/2019 | Matetic | H04L 9/3247 |
| 2019/0349190 | A1* | 11/2019 | Smith | H04L 69/18 |
| 2019/0349254 | A1* | 11/2019 | Nolan | H04L 67/1093 |
| 2019/0349261 | A1* | 11/2019 | Smith | H04L 67/1046 |
| 2019/0349426 | A1* | 11/2019 | Smith | H04L 67/104 |
| 2019/0349733 | A1* | 11/2019 | Nolan | H04L 41/0806 |
| 2020/0036519 | A1* | 1/2020 | Bitauld | H04L 9/088 |
| 2020/0045019 | A1* | 2/2020 | Huang | H04L 63/0281 |

OTHER PUBLICATIONS

Thomas Hardjono and Ned Smith. 2016. Cloud-Based Commissioning of Constrained Devices using Permissioned Blockchains. In Proceedings of the 2nd ACM International Workshop on IoT Privacy, Trust, and Security (IoTPTS '16). Association for Computing Machinery, New York, NY, USA, 29-36. (Year: 2016).*

Fremantle, Paul, Benjamin Aziz and Tom Kirkham. "Enhancing IoT Security and Privacy with Distributed Ledgers—A Position Paper-." IoTBDS (2017). (Year: 2017).*

Kiss, et al., "Private Set Intersection for Unequal Set Sizes with Mobile Applications", Proceedings on Privacy Enhancing Technologies, 2017, p. 177-197. (Year: 2017).*

Asokan et al. The Circle Game: Scalable Private Membership Test Using Trusted Hardware. In Proceedings of the 2017 ACM on Asia Conference on Computer and Communications Security (ASIA CCS '17). Association for Computing Machinery, New York, NY, USA, 31-44. (Year: 2017).*

Wang S., Ding X., Deng R.H., Bao F. (2006) Private Information Retrieval Using Trusted Hardware. In: Gollmann D., Meier J., Sabelfeld A. (eds) Computer Security—ESORICS 2006. ESORICS 2006. Lecture Notes in Computer Science, vol. 4189. Springer, Berlin, Heidelberg (Year: 2006).*

Lind, Joshua et al. "Teechan: Payment Channels Using Trusted Execution Environments," arXiv:1612.07766v1, Cornell University Library, Ithaca, NY, Dec. 22, 2016, XP080742528.

Simon Johnson et al: "Intel Software Guard Extensions; EPID Provisioning and Attestation Services", Mar. 9, 2016 (Mar. 9, 2016), pp. 1-10, XP055469620.

Sinisa Matetic et al: "BITE:: Bitcoin Lightweight Client Privacy using Trusted Execution", IACR, International Association for Cryptologic Research, vol. 20180906:174749, Sep. 6, 2018 (Sep. 6, 2018), pp. 1-34, XP061026394.

Arthur Gervais et al: "On the Privacy Provisions of Bloom Filters in Lightweight Bitcoin Clients", International Association for Cryptologic Research, vol. 20141013:202348, Oct. 13, 2014 (Oct. 13, 2014), pp. 1-11, XP061017111.

Satoshi Nakamoto: "Bitcoin: A Peer-to-Peer Electronic Cash System", Oct. 31, 2008 (Oct. 31, 2008), pp. 1-9, XP055387899.

Ittai Anati et al: "Innovative Technology for CPU Based Attestation and Sealing", Aug. 14, 2013 (Apr. 14, 2013), XP055189759.

Alexander B., "Introduction to Intel SGX Sealing", May 4, 2016, pp. 1-3.

Burton H. Bloom, "Space/Time Trade-offs in Hash Coding with Allowable Errors", Communications of the ACM, vol. 13, No. 7, Jul. 1970, pp. 422-426.

Ken Christensen, et al., "A new analysis of the false positive rate of a Bloom filter", Information Processing Letters 110, Dec. 2010, pp. 944-949.

Victor Costan, et al., "Intel SGX Explained", Cryptology ePrint Archive, Dec. 2016, pp. 1-118.

Arthur Gervais, et al., "On the Privacy Provisions of Bloom Filters in Lightweight Bitcoin Clients", Proceedings of the 30th Annual Computer Security Applications Conference, Dec. 2014, pp. 326-335.

Mike Hearn, et al., "Connection Bloom Filtering", Bitcoin Improvement Proposal, 37, Oct. 24, 2012, pp. 1-5.

Satoshi Nakamoto, "Bitcoin: A Peer-to-Peer Electronic Cash System", Dec. 2008, pp. 1-9.

\* cited by examiner

METHOD AND SYSTEM OF PRESERVING PRIVACY FOR USAGE OF LIGHTWEIGHT BLOCKCHAIN CLIENTS

FIELD

The present invention relates to blockchain networks, and in particular to a method and system of preserving privacy for usage of lightweight blockchain clients in the blockchain networks.

BACKGROUND

One use of blockchain networks is for online transactions using cryptocurrencies, such as Bitcoin. Bitcoin is a fully distributed cryptocurrency that performs time-stamping of incoming transaction coming from its users and orders them in time. Fully distributed entails that Bitcoin operates on top of a peer-to-peer (P2P) network to serve its clients. Time-stamping entails collecting transactions, ordering them by the time of arrival and including them in blocks. These blocks are tied to each other in a manner that each subsequent block contains the hash of the previous block, thereby creating a unique Bitcoin blockchain.

Bitcoin enables its users to perform mutual payments by issuing transactions that are connected to specific addresses. In a regular Bitcoin transaction, bitcoins (BTC) are transferred from one or more input addresses to one or more output addresses. These addresses actually indicate public keys. Only a user that knows the corresponding private key of that public-private key pair may spend the bitcoin connected to a specific public address.

When a user wants to perform a payment she creates a transaction with all the needed parameters, such as input and output addresses along with the amount of BTC that is to be transferred. Subsequently, the transaction is signed and sent to all nodes using the P2P network. Nodes across the network collect transactions and form blocks. These blocks are generated by a special type of nodes (clients) called miners that have to solve a hash-based proof-of-work (PoW) task. The first miner to mine the block broadcasts it to all other nodes for verification of the block correctness and inclusion to the blockchain. Bitcoin is designed in a way that all nodes in the system have to verify the transactions and blocks received from the network. This results in computational and storage intensive operations which are ever increasing with the size of the whole blockchain system.

The original Bitcoin paper, S. Nakamoto, "Bitcoin: A peer-to-peer electronic cash system," (2008) already initially proposed lightweight clients that operate on Simplified Payment Verification (SPV) mode. Unlike full nodes, SPV nodes do not receive and validate all transactions broadcasted to the P2P network, nor do they store the whole blockchain. The verification of all transactions is offloaded to the full node to which the lightweight node connects, while a small and limited subset of transactions is still forwarded. In order for SPV clients to calculate their existing BTC balance, the full node delivers requested blocks to the SPV client based on the search (filter) criteria.

The filtering of transactional data from blocks, used to calculate the amount of BTC owned by a specific user using a lightweight client, is currently performed using Bloom filters as schematically shown in FIG. 1. Bloom filters were first introduced by B. H. Bloom, "Space/time trade-offs in hash coding with allowable errors," Communications of the ACM, 13(7), pages 422-426 (1970) as a general schematic. A Bloom filter is a data structure used to evaluate membership of certain elements in the group. Bloom filters are used in lightweight clients in order to provide some level of anonymity and privacy to the end users due the probabilistic characteristics of Bloom filters. In particular, Bloom filters can be defined as using a target false positives rate which will masquerade the requested responses, so that the full node cannot create a clear one-on-one relationship between a client and all addresses. The lightweight client specifies the filter and sends it to the full node. The full node checks if transactions are relevant to this specific Bloom filter, and if yes, forwards them along with the information on amounts back to the lightweight client.

K. Christensen, et al. "A new analysis of the false positive rate of a bloom filter," Information Processing Letters, 110(21), pages 944-949 (2010) and M. Hearn, et al., "Connection bloom filtering," Bitcoin Improvement Proposal, 37 (2012) provide further information on Bloom filters.

To create a full Bitcoin node, a user has to install the full client node which currently requires 145 GB of space. Due to the increasing popularity of Bitcoin, the volume of transactions is ever increasing. This results in an increase in the size of the Bitcoin blockchain as well. For example, from September 2016 to September 2017, the blockchain grew over 50%, going from a size of 80 GB to a size of over 130 GB of transactional data. Taking into consideration all the available facts, wider deployment and usage of the Bitcoin cryptocurrency, a further steep increase in the blockchain size is expected. The size of the blockchain is not the only concern for the future. Additionally, the large transactional volume also incurs considerable overhead in terms of blocks and transaction verification over the P2P network. Namely, each transaction is broadcasted to all Bitcoin nodes for verification and update of the local chain residing in each node's memory.

For a dedicated full node, built only to support Bitcoin and operate through the protocol, the foregoing constraints might not pose a direct issue. However, with the wider adoption of Bitcoin and the increasing number of users, the foregoing constraints present problems for the blockchain network. Users in general do not want to run full client nodes and verify all incoming transactions, while they still do want to use Bitcoin and perform payments. The reason behind this is that, in order to run a full node, a user would have to have a powerful, resourceful machine that can execute the necessary operations and store the complete blockchain. This reduces the usability drastically.

Since the original Bitcoin paper, the Bitcoin community has released several lightweight clients, such as BitcoinJ, PicoCoin and Electrum. These operate using the SPV mode where only a small portion of the full blockchain is downloaded to accommodate the needs of the specific client. SPV mode allows normal usage of Bitcoin on power and storage-space constrained devices such as mobile phones, tablets, or older personal computers with lower processing capabilities and memory. However, the usage of lightweight clients comes at a cost, primarily privacy loss. In order to be able to run normal Bitcoin operations, the lightweight client has to rely and trust a full node that has access to the complete blockchain. As discussed above, the lightweight clients use Bloom filters in order to achieve some degree of privacy on their operations. However, A. Gervais, et al., "On the privacy provisions of bloom filters in lightweight bitcoin clients," In Proceedings of the 30th Annual Computer Security Applications Conference, ACM, pages 326-335 (2014), which is incorporated by reference herein, determined that this method still leaks data to a compromised full node (that wants to track and spy on the lightweight clients).

Another technology, Software Guard Extensions (SGX) by INTEL, as schematically illustrated in FIG. 2 and described by V. Costan, et al., "Intel SGX explained," In Cryptology ePrint Archive (2016) which is incorporated by reference herein, enables execution of security-critical application code, called enclaves, in isolation from untrusted system software. Protections in the processor ensure that a malicious operating system (OS) cannot read or modify enclave memory at runtime. To protect enclave data across executions, SGX provides a security mechanism called sealing that allows each enclave to encrypt and authenticate data for persistent storage. SGX-enabled processors are equipped with certified cryptographic keys that can issue remotely verifiable attestation statements on the software configuration of enclaves. Through these security mechanisms (isolation, sealing, attestation) SGX enables development of various applications and online services with hardened security. While SGX has been used for consensus realization, it has not been discovered prior to the present invention to have any utility in implementing lightweight clients in a blockchain network. SGX enclaves have access to the protected runtime memory only, while any other outside communication has to go through the unsecure application. Additionally, enclaves do not have access to any secure storage, trusted global or system time.

For runtime isolation, the SGX security architecture guarantees that enclaves are isolated from all software running outside of the enclave, including the OS, other enclaves, and peripherals. Isolation means that the control flow integrity of the enclave is preserved and other software cannot observe its state.

Attestation is the process of verifying that a certain enclave code has been properly initialized. In local attestation, a prover enclave can request a statement that contains measurements of its initialization sequence, enclave code and the issuer key. Another enclave on the same platform can verify this statement using a shared key created by the processor. In remote attestation, the verifier may reside on another platform.

Enclaves can save confidential data across executions. Sealing is the process to encrypt and authenticate enclave data for persistent storage and is further described by B. Alexander, "Introduction to Intel SGX Sealing, (2016), also incorporated by reference herein. All local persistent storage (e.g., disk) is controlled by the untrusted OS. For each enclave, the SGX architecture provides a sealing key that is private to the executing platform and the enclave.

SUMMARY

In an embodiment, the present invention provides a method of preserving privacy for usage of a lightweight blockchain client in a blockchain network. In a full blockchain node of the blockchain network, a secure software guard extensions (SGX) enclave is used. A request is received from the lightweight blockchain client for a setup of a secure network connection. A client unique ID is received from the lightweight blockchain client, and the client unique id sent by the lightweight blockchain client is acknowledged following a successful attestation by the lightweight blockchain client. A request is received from the lightweight blockchain client for at least one transaction or address of the lightweight blockchain client. The SGX enclave loads and searches unspent transaction outputs (UTXO) from a memory of the full blockchain node and sends a response to the request from the lightweight blockchain client for the at least one transaction or address based on a match from the searching the UTXO. The secure communication is then terminated with the lightweight blockchain client.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
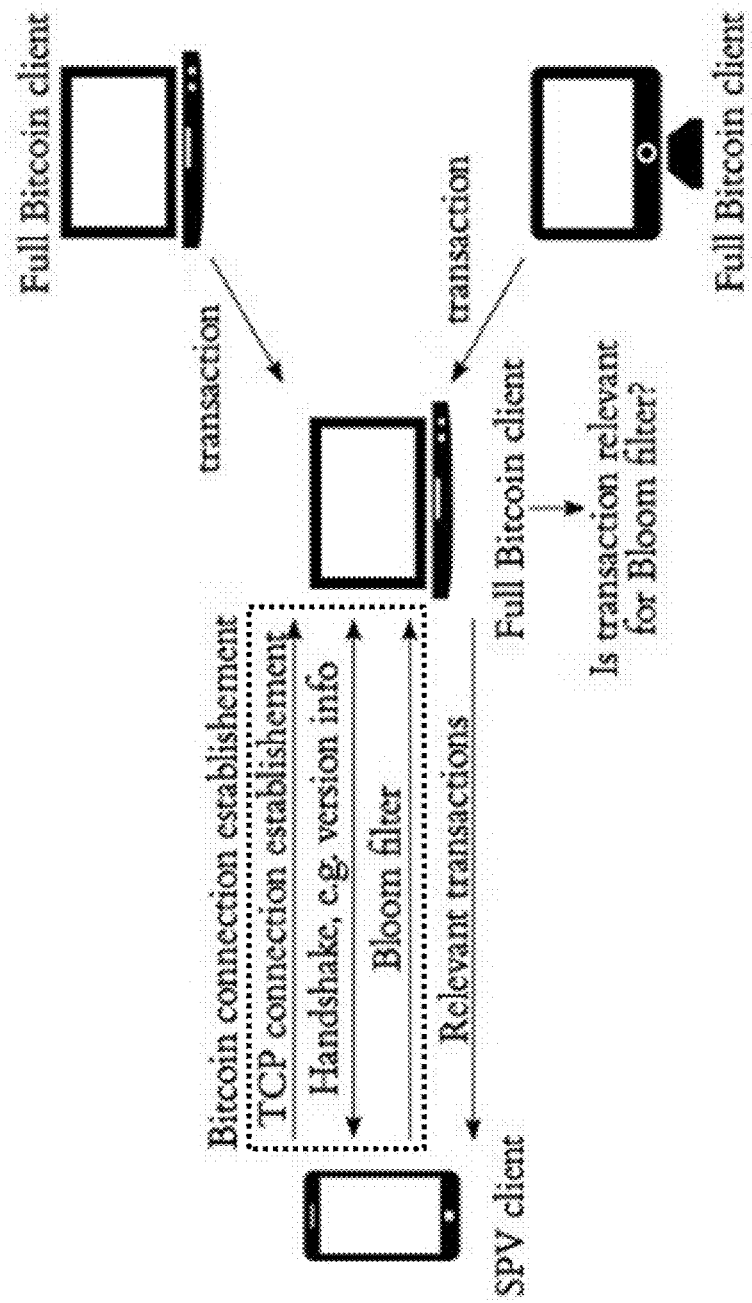
FIG. 1 schematically shows an SPV operation mode using Bloom filters.
Figure 2:
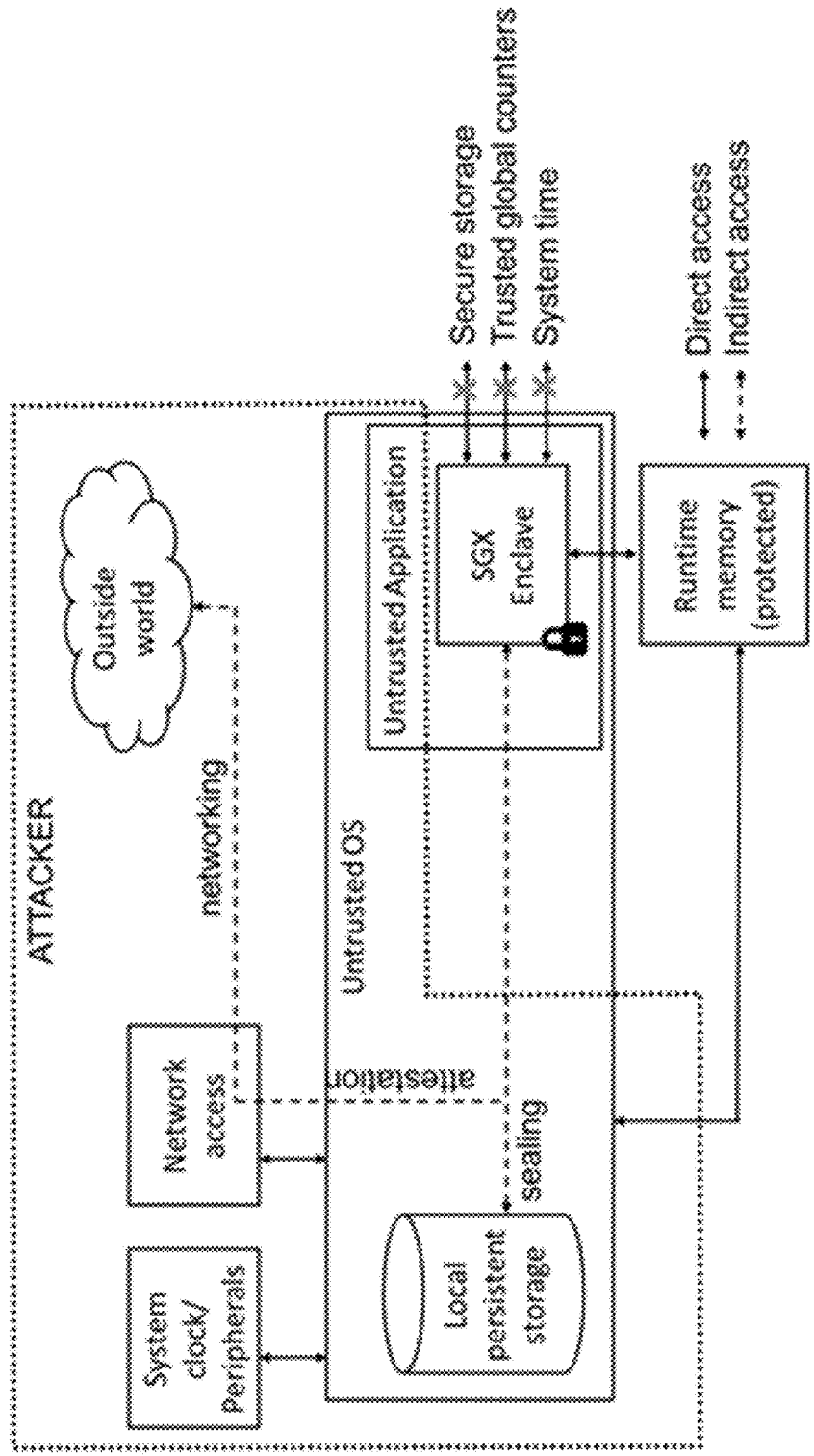
FIG. 2 schematically shows an SGX operational model.

Embodiments of the present invention mitigate the privacy preservation issues that arise with lightweight clients by using trusted execution environments. As discussed above, these privacy preservation issues are unique to the blockchain network implementing lightweight clients. While usage of lightweight clients for the blockchain network, such as Bitcoin, introduces many benefits for the end user since users may perform payments on resource-constrained devices and without too much communication overhead, the increased usability comes at a price, including a loss of privacy. When a lightweight client wishes to verify the available amount of BTC on its addresses, the lightweight client has to send some identifying information to the full node in order to get a response. Bloom filters were introduced to solve the problem, but as recent work shows, information leakage still occurs when using Bloom filters.

Embodiments of the present invention increase privacy for lightweight clients by redesigning and improving a full node. At the same time, full functionality can remain unchanged. Thus, another security layer is provided to protect the privacy of lightweight clients without compromising operability of the system. According to embodiments of the present invention, a lightweight client is able to retrieve information about the amount of BTC connected to the addresses of the lightweight client without insecurely releasing any information about these addresses to the full node. While described herein at parts with respect to the Bitcoin system, embodiments of the present invention also apply to other blockchain systems.

An attacker model is designed to address a powerful adversary who controls all system software on the target platform where the full Bitcoin node is running, including the OS. SGX is modeled in accordance with an embodiment of the present invention in such a way that the adversary has the ability to schedule and restart enclaves, start multiple instances, block, delay or read and modify all messages sent by enclaves, either to the OS itself or to other entities over the network. The adversary also sits on the network layer such that the adversary is able to sniff all network traffic, delay, block, re-route and create network packets. This resembles a Dolev-Yao network attacker.

However, the adversary has no ability to read or modify enclave runtime memory, nor to learn any information about the private data held in the enclave data. Thus, the adversary cannot break the hardware security of SGX and cannot access processor-specific keys (e.g. attestation key, sealing key, etc.). Also, the adversary cannot break any cryptographic primitives provided by the SGX architecture, nor the primitives created by a developer that reside and operate inside of the isolated execution environment. Further, the adversary cannot compromise the lightweight client and extract information from it directly (e.g., communication between the lightweight client and the full node is cryptographically protected). To prevent the adversary from linking different client requests to the full node when observing the network (inference attack), the lightweight client could use software which enables anonymous communication, such as TOR.

According to embodiments of the present invention, it is assumed that the lightweight clients connect to full Bitcoin nodes when they want to acquire information about their transactions and available amounts of BTC. The design of the lightweight clients can remain generally the same, but the lightweight clients are not designed to use Bloom filters. Due to the introduction of a secure architecture inside of the full Bitcoin nodes in accordance with embodiments of the present invention, Bloom filters, as a method for preserving privacy, are not needed since the privacy is guaranteed by the usage of SGX enclaves adapted for use in the inventive arrangements of the present invention in a full node of the blockchain network. Lightweight clients can directly send requests for their transactions to the full nodes (although in an encrypted form).

A high-level system model can resemble the one shown in FIG. 1, without Bloom filters and with an improved full node. Lightweight clients connect to one of the improved full nodes that support full privacy preservation. A lightweight client can choose any available full node to connect to. The connection establishment between the lightweight client and the full node uses secure bootstrapping for confidential communication between the client and the enclave residing in the full node. These two entities perform an authenticated Diffie-Helman key exchange to establish a session key. The lightweight client has a unique identifier with which it can authenticate to the full node for future sessions. This is advantageous for frequent, repeated or incrementally larger requests. After the session is established, the lightweight client sends a message containing all of the transaction for which the lightweight client needs additional information. In order to prevent an attacker from snooping and gaining additional knowledge about the message itself, the messages can be always of constant size. The size itself will be defined to accommodate the majority of request. For example, the most wide-spread usage can contain x transactions with some variance v, and the message size will be set to accommodate x+v+1.

Figure 3:
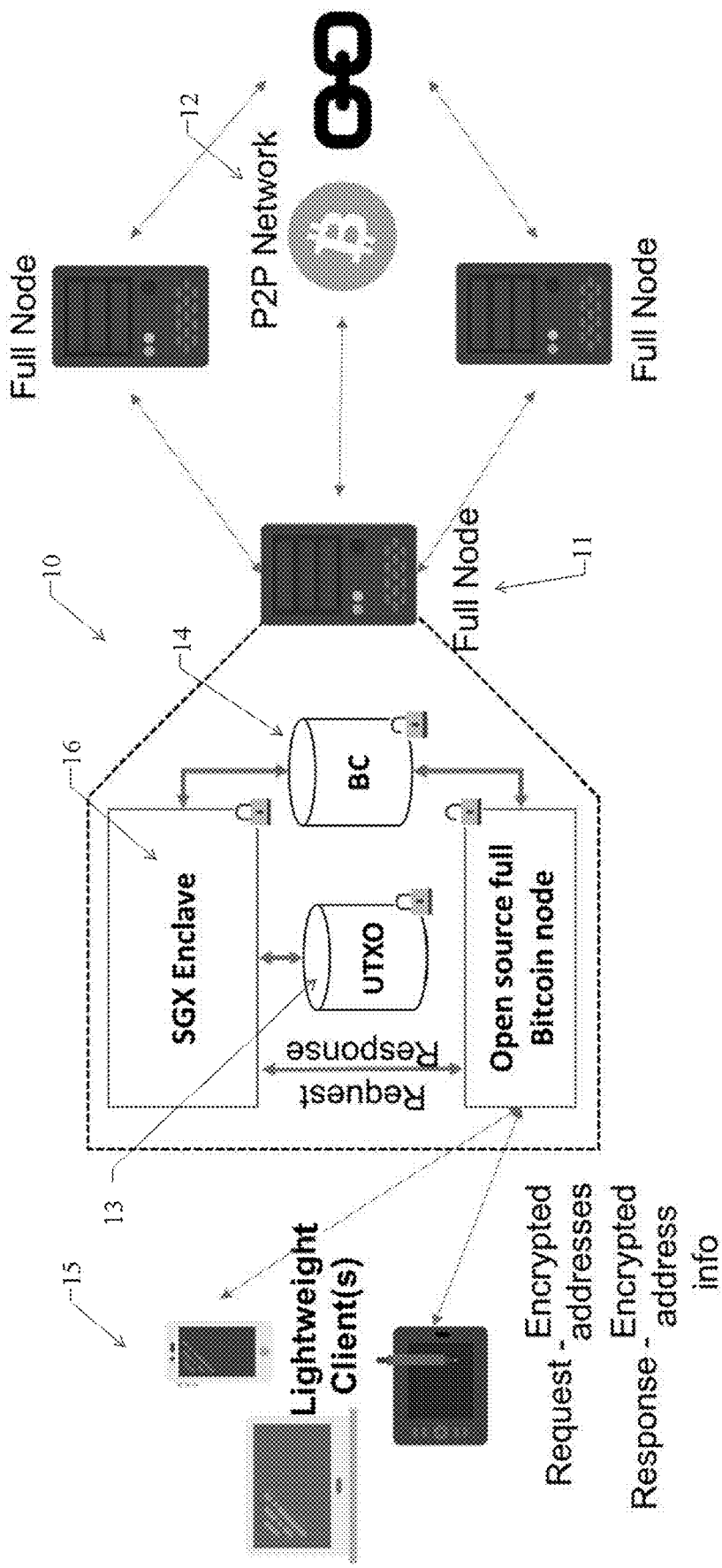
FIG. 3 schematically shows an improved full node in accordance with an embodiment of the present invention.

FIG. 3 schematically shows a low-level model of an improved full node model implemented in a blockchain network 10. On initialization (i.e., first installation of the node), a full node 11 has to download the full blockchain 14 from the P2P Bitcoin network 12. Next, the full node 11 has to create a database of unspent transaction outputs (UTXO) 13 by scanning through the whole blockchain 14. UTXO 13 will be used for each request from a lightweight client 15 to extract the necessary information. Additionally, UTXO 13 is updated regularly as each new block is appended to the blockchain 14. The changes to the full node 11 do not change the operation mode of the node for normal Bitcoin operation, neither are any of the components for verifying transactions, mining, etc., transferred to the secure SGX enclave 16. The SGX enclave 16 only performs operations that are relevant to the connected lightweight clients 15.

After receiving the message from a lightweight client 15, the full node 11 forwards the request to the SGX enclave 16, which decrypts it and extracts the transactions. To form a response for the specific lightweight client 15 the SGX enclave 16 has to load the UTXO 13, search through it, and save all the matching information for these transaction. These results are cached in the SGX enclave 16 and pinned to a specific identifier of the lightweight client 15. In this way, a repeated request from the same lightweight client 15 can be processed quickly. After a response is created, it is encrypted with the session key and returned to the requesting lightweight client 15. The size of the response message follow the same design as the request message explained earlier. The size is preferably constant while the exact number is to be determined upon evaluation. Additionally, if the response or the request respectively are bigger than of the pre-set constant size, two messages can be created. The lightweight client 15 receives and decrypts the response, acquiring the needed information.

Figure 4:
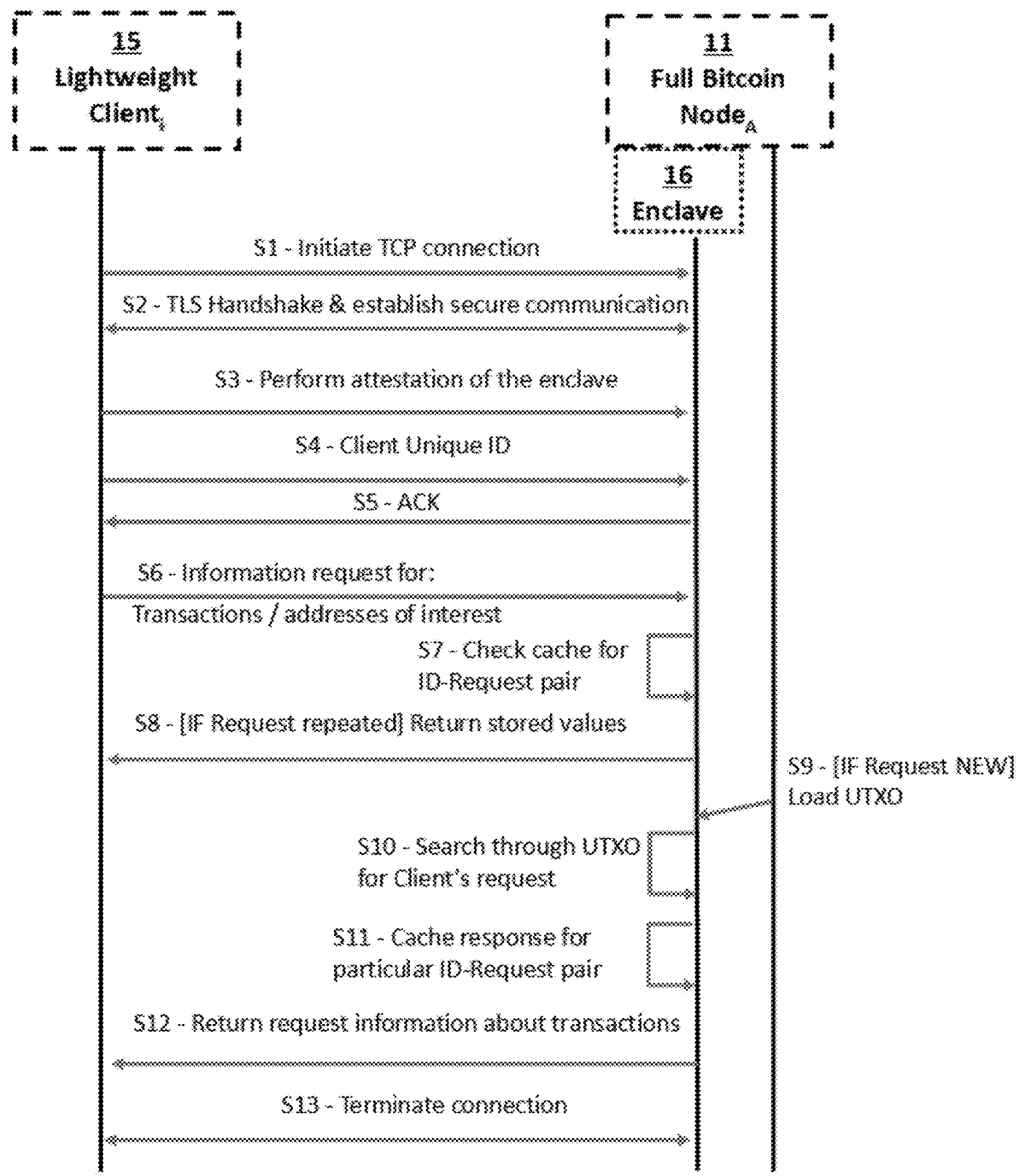
FIG. 4 schematically shows a system protocol for communication between lightweight clients and the full node.

FIG. 4 illustrates details of a system protocol for the above-described system in more detail. In a first step S1, the lightweight client 15 initiates a transmission control protocol (TCP) connection to the secure SGX enclave 16. After that, in a step S2, the lightweight client 15 performs a transport layer security (TLS) handshake and establishes secure communication with the SGX enclave 16 in the full node 11. In order to be certain of the enclave identity and that this specific service for transactional information retrieval is running inside of the secure SGX enclave 16, the lightweight client 15 performs the attestation in a step S3. If the attestation is successful, the lightweight client 15 identifies itself with a unique ID (used by the full node 11 later on for repeated requests and performance optimization) in a step S4. After the acknowledgment by the full node 11 in a step S5, the lightweight client 15 sends a request towards the SGX enclave 16 in a step S6 containing the transactions/addresses for which the lightweight client 15 needs additional information, such as the amount of unspent BTC. In a step S7, the SGX enclave 16 first checks its cached memory for this specific request tied to the unique ID of the lightweight client 15. If there exists one, the SGX enclave 16 just forwards the response created in some earlier phase in step S8. If there is no previous matching response, the SGX enclave 16 loads the UTXO 13 from the full node 11 in a step S9 and performs a search over the data in a step S10. If a result is found, the SGX enclave 16 stores the result tied to the originating client ID in its cache in a step S11. Subsequently, in a step S12, the SGX enclave 16 sends the response back to the lightweight client 15, after which the communication between the two is terminated in a step S13. Preferably, all of the messages between the SGX enclave 16 and the lightweight client 15, are authenticated, encrypted and with guaranteed freshness, thereby providing security against relay attacks. While the SGX enclave 16 does not have the ability to directly communicate over the network, the communication goes through the accompanying application (in this case, the full node 11). However, a malicious full node is not able to modify or read the exchanged messages by establishing a secure connection.

Figure 5:
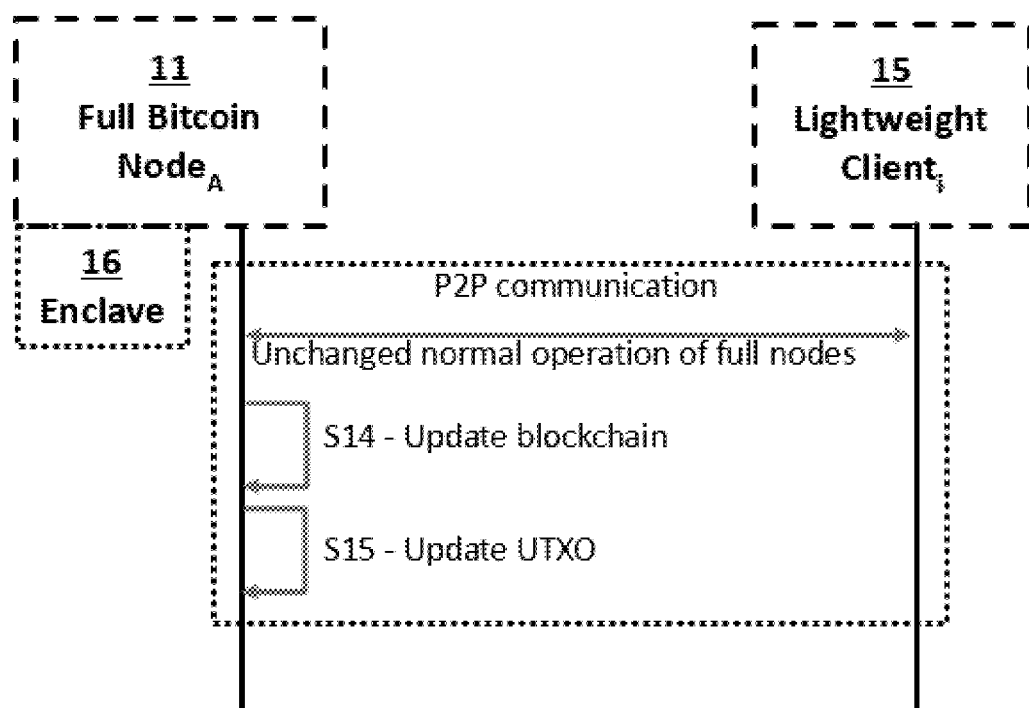
FIG. 5 schematically shows further details of a system protocol for communication between lightweight clients and the full node.

As Shown in FIG. 5, communication occurs between the full node 11 and the lightweight client 15, and the full node 11 allows the messages to pass to the SGX enclave 16. The normal functional operations of the lightweight client 15 can remain unchanged. In steps S14 and S15, the full node periodically updates the databases of the blockchain 14 and the UTXO 13, respectively. Preferably, steps S14 and S15 are performed after each transaction is performed by or broadcasted to the full node 11 for verification.

One main performance metric is the time taken for the lightweight client 15 to acquire all necessary information about the amount for the addresses (accounts) of the lightweight client 15. Upon establishing a secure connection to the SGX enclave 16 residing on the full node 11, the lightweight client 15 sends a packet containing addresses for which the additional information is needed. The SGX enclave 16 will then search through the UTXO 13 from the blockchain 14 and deliver the requested result back to the lightweight client 15.

At the time of first setup of the system, the full node 11 has to create the UTXO 13 by scanning through the whole blockchain 14. Due to the size of the current blockchain (approx. 135 GB), the search process is going to be time consuming. Some main aggravating circumstances in this case are the disk's read speed and the load-time of blockchain data into random access memory (RAM). The created database will amount to approximately 55 million transactions and about 3 GB of storage space. The database is periodically updated after each block is added to the blockchain 14.

For each initial request from a new lightweight client 15, the full node 11 has to search through the whole database of the UTXO 13. In this case, some main aggravating circumstances are also the disk's read speed, load-time of database data into RAM (SGX allows only 128 MB of RAM per enclave so the database has to be loaded and searched in chunks) and entering-existing the secure isolation environment context.

Embodiments of the present invention provide improved performance for lightweight clients 15 that are repeating their initial request for the same addresses for which they asked the information in the past. In that case, the full node 11 only has to scan the difference in the created database of the UTXO 13 incurred from the time of the last request and the latest block available upon the new repeated request. If any new information is requested from the full node 11, the complete search procedure outlined above is repeated. Accordingly, while searching through the blockchain 14 still occurs at first setup, embodiments of the present performance thereafter permit reduced search times and computational burden using the UTXO on the improved full node 11 with the SGX enclave 16.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of preserving privacy for usage of a lightweight blockchain client in a blockchain network, the method comprising:

using, in a full blockchain node of the blockchain network, a secure software guard extensions (SGX) enclave;

receiving a request from the lightweight blockchain client for a setup of a secure network connection;

receiving a client unique ID from the lightweight blockchain client, and acknowledging the client unique id sent by the lightweight blockchain client following a successful attestation by the lightweight blockchain client;

receiving a request from the lightweight blockchain client for at least one transaction or address of the lightweight blockchain client;

loading and searching, by the SGX enclave, unspent transaction outputs (UTXO) from a memory of the full blockchain node and sending a response to the request from the lightweight blockchain client for the at least one transaction or address based on a match from the searching the UTXO; and terminating the secure communication with the lightweight blockchain client.

2. The method according to claim 1, further comprising checking, by the SGX enclave prior to the loading and searching of the UTXO, whether the request from the lightweight blockchain client for the at least one transaction or address exists in a cache memory of the full blockchain node tied to the client unique ID and, based thereon, sending the response to the lightweight blockchain client created in an earlier phase.

3. The method according to claim 1, further comprising, at initialization of the full blockchain node, scanning a blockchain of the blockchain network and storing the UTXO in the memory.

4. The method according to claim 2, further comprising updating the UTXO in the memory of the full blockchain node based on an addition of one or more blocks to the blockchain.

5. The method according to claim 1, further comprising storing a result of the match of the searching of the UTXO in the cache memory of the full blockchain node tied to the unique id of the lightweight blockchain client.

6. The method according to claim 1, further comprising updating a copy of a blockchain of the blockchain network in a database of the full blockchain node based on the response being sent to the lightweight blockchain client.

7. The method according to claim 1, wherein the full blockchain node receives a request from the lightweight blockchain to initiate a transmission control protocol (TCP)

connection, and, based thereon, secure communication is established between the full blockchain node and the lightweight blockchain client following a transport layer security (TLS) handshake.

8. A full blockchain node disposed in a block chain and using a secure software guard extensions (SGX) enclave, the full blockchain node being configured to preserve privacy for usage of a lightweight blockchain client by providing for execution of the following steps:

receiving a request from the lightweight blockchain client for a setup of a secure network connection;

receiving a client unique ID from the lightweight blockchain client, and acknowledging the client unique id sent by the lightweight blockchain client following a successful attestation by the lightweight blockchain client;

receiving a request from the lightweight blockchain client for at least one transaction or address of the lightweight blockchain client;

loading and searching, by the SGX enclave, unspent transaction outputs (UTXO) from a memory of the full blockchain node and sending a response to the request from the lightweight blockchain client for the at least one transaction or address based on a match from the searching the UTXO;

and terminating the secure communication with the lightweight blockchain client.

9. The full blockchain node according to claim 8, being further configured to check, prior to the loading and searching of the UTXO, whether the request from the lightweight blockchain client for the at least one transaction or address exists in a cache memory of the full blockchain node tied to the client unique ID and, based thereon, send the response to the lightweight blockchain client created in an earlier phase.

10. The full blockchain node according to claim 8, being further configured to scan a blockchain of the blockchain network and store the UTXO in the memory at initialization of the full blockchain node.

11. The full blockchain node according to claim 10, being further configured to update the UTXO in the memory of the full blockchain node based on an addition of one or more blocks to the blockchain.

12. The full blockchain node according to claim 8, being further configured to store a result of the match of the searching of the UTXO in the cache memory of the full blockchain node tied to the unique id of the lightweight blockchain client.

13. The full blockchain node according to claim 8, being further configured to update a copy of a blockchain of the blockchain network in a database of the full blockchain node based on the response being sent to the lightweight blockchain client.

14. The full blockchain node according to claim 8, being further configured to receive a request from the lightweight blockchain to initiate a transmission control protocol (TCP) connection, and, based thereon, secure communication is established between the full blockchain node and the lightweight blockchain client following a transport layer security (TLS) handshake.

* * * * *